(12) United States Patent
Sasaki et al.

(10) Patent No.: US 7,006,539 B1
(45) Date of Patent: Feb. 28, 2006

(54) NONLINEAR OPTICAL CRYSTAL

(75) Inventors: Takatomo Sasaki, Suita (JP); Yusuke Mori, Osaka (JP); Masashi Yoshimura, Hiroshima (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/762,100

(22) PCT Filed: Aug. 4, 1999

(86) PCT No.: PCT/JP99/04199

§ 371 (c)(1),
(2), (4) Date: Apr. 6, 2001

(87) PCT Pub. No.: WO00/08524

PCT Pub. Date: Feb. 17, 2000

(30) Foreign Application Priority Data

Aug. 4, 1998 (JP) .................................. 10-220914

(51) Int. Cl.
*H01S 3/10* (2006.01)

(52) U.S. Cl. ............................ 372/21; 372/22; 372/30; 372/70

(58) Field of Classification Search .................. 372/21, 372/22, 30
See application file for complete search history.

(56) References Cited

U.S. PATENT DOCUMENTS 4,746,396 A * 5/1988 Marnier ........................ 117/80
5,343,327 A * 8/1994 Chai et al. .................. 359/330

FOREIGN PATENT DOCUMENTS

JP    8-54656    2/1996

OTHER PUBLICATIONS

Nig Ye, et al., A new nonlinear optical crystal K2Al2B2O7, May 1999, Optical Society of America, Conference on Lasers and Electro-Optics, May 23-28, 1999.*
Russian Article No 16, 1983.*
SPIE Web: Two new nonlinear optical crystals: BaAl2B2O7 and K2Al2B2O7 by Ning ye et al.*
Kochina et al., X-Rau Study of the K2O-Al2O3-B2O3 System, 1983, Vestnik LGU, No. 16, pp. 40-46.*
Zhang-Gui Hu et al., Proceedings of SPIE—The International Society for Optical Engineering, vol. 3556, pp. 156-161, Sep., 1998.
Ning Ye et al., Proceedings of SPIE—The International Society for Optical Engineering, vol. 3556, pp. 21-23, Sep., 1998.
Zhang-Gui Hu et al., Japanese Journal of Applied Physics, Part 2, vol. 37, No. 10A, pp. L1093-L1094, Oct., 1998.
Kozhina et al., Vestn. Leningr. Univ., Fiz., Khim., No. 3, pp. 40-46, 1983.

(Continued)

*Primary Examiner*—Minsun Oh Harvey
*Assistant Examiner*—Dung (Michael) T. Nguyen
(74) *Attorney, Agent, or Firm*—Wenderoth, Lind & Ponack, L.L.P.

(57) ABSTRACT

There is provided a nonlinear optical crystal which is presented by the formula: $K_2Al_2B_2O_7$. This nonlinear optical crystal is a vacuum ultraviolet light generating nonlinear optical crystal which is easy to grow and of high practical use. There are also provided a wavelength conversion method using this crystal, and an element and a wavelength conversion apparatus for use in the method.

10 Claims, 3 Drawing Sheets

OTHER PUBLICATIONS

Chen et al., Proceedings of SPIE—The International Society for Optical Engineering, vol. 3556, pp. 14-20, Sep., 1998.

Mori et al., The Review of Laser Engineering, vol. 26, No. 3, pp. 215-219, Mar., 1998.

Chen et al., Nature, vol. 373, No. 6512, pp. 322-324, 1995.

Chen et al., Journal of Applied Physics, vol. 77, No. 6, pp. 2268-2272, 1995.

* cited by examiner

NONLINEAR OPTICAL CRYSTAL

This application is a 371 application of PCT/JP99/04199 filed Aug. 4, 1999.

BACKGROUND OF THE INVENTION

1. Field of the Invention

The present invention relates to a nonlinear optical crystal. More specifically, the invention relates to a novel nonlinear optical crystal useful as a wavelength conversion crystal for generating vacuum ultraviolet light or the like, and a wavelength conversion method using the wavelength conversion crystal, as well as an element and a wavelength conversion apparatus for use in the method.

2. Background Art

With the development of laser technology, it has become an importance subject to realize solid-state lasers having performance which allows for the applications of laser technology. One such subject is to put into practice all solid-state vacuum ultraviolet laser light sources of shorter wavelength.

To realize an entirely solid-state vacuum ultraviolet laser light source of short wavelength, there is a need for a nonlinear optical crystal which has a double refraction index of about 0.07 and an absorption edge which lies in the range of short wavelengths of 150–160 nm. As prior art nonlinear optical crystals which satisfy these characteristics, the following ones have been known:

$Sr_2Be_2B_2O_7$ (SBBO), $KBe_2BO_3F_2$.

These publicly known prior art SBBO and KBBF, however, have the large problem that both crystals are difficult to obtain, because they are extremely difficult to grow.

SUMMARY OF THE INVENTION

Therefore, the invention provides a nonlinear optical crystal. More specifically, the invention provides a novel nonlinear optical crystal for an entirely solid-state generation of vacuum ultraviolet light, which has the required characteristics and is easy to obtain through crystal growth instead of the prior art SBBO and KBBF, and a wavelength conversion method using such novel nonlinear optical crystal, as well as an element and a wavelength conversion apparatus for use in the method.

To solve the above-described subject, the invention provides a nonlinear optical crystal represented by $K_2Al_2B_2O_7$, and a wavelength conversion method using this nonlinear optical crystal, as well as an element and a wavelength conversion apparatus for use in the method.

BRIEF DESCRIPTION OF THE DRAWINGS

The invention will become more readily appreciated and understood from the following detailed description of a preferred embodiment of the invention when taken in conjunction with the accompanying drawings, in which.

DETAILED DESCRIPTION OF THE INVENTION

An embodiment of the invention will be described below with reference to a nonlinear optical crystal represented by $K_2Al_2B_2O_7$ (referred to simply as the KAB crystal) which is provided according to the invention. The KAB crystal has a structure in which K and Al are substituted for the respective Sr and Be sites of the publicly known SBBO crystal, i.e., $Sr_2Be_2B_2O_7$, although there is a difference in electric charge between both crystals.

The KAB crystal of this invention has a double refraction index of about 0.07 which is a nature approximately equal to that of the publicly known SBBO crystal. Accordingly, the KAB crystal is expected to generate vacuum ultraviolet light. The KAB crystal can easily be grown by a method such as a flux method.

The flux method is one kind of solution growth method, and is characterized by TSSG (Top Seeded Solution Growth), i.e., the process in which a seed crystal attached to a rotating shaft is immersed immediately below the surface of a solution to increase the degree of supersaturation by means of a decrease in temperature, thereby growing a crystal. In addition, the flux method is characterized by melting a flux and a source material.

Since the melting point of the KAB crystal is high, it is more preferable to grow the KAB crystal by the flux method (solution growth method) than by a melt method (melt growth method).

In this flux method, the crystal growth can be made far easier by using a flux such as lead oxide, sodium fluoride (NaF) cesium fluoride (CsF), lead fluoride or potassium chloride.

Accordingly, the KAB crystal of the invention is easy to grow and is superior in practical terms, and is extremely useful as a practical nonlinear optical crystal for generating vacuum ultraviolet light.

This crystal is actually utilized as an element for wavelength conversion or a wavelength conversion apparatus incorporated in this element.

Incidentally, it goes without saying that inevitable trace elements are allowed to be inevitably incorporated into the composition of the crystal of the invention by a growth process or a source material.

This invention will be described below in further detail with reference to an example.

EXAMPLE

Figure 1:
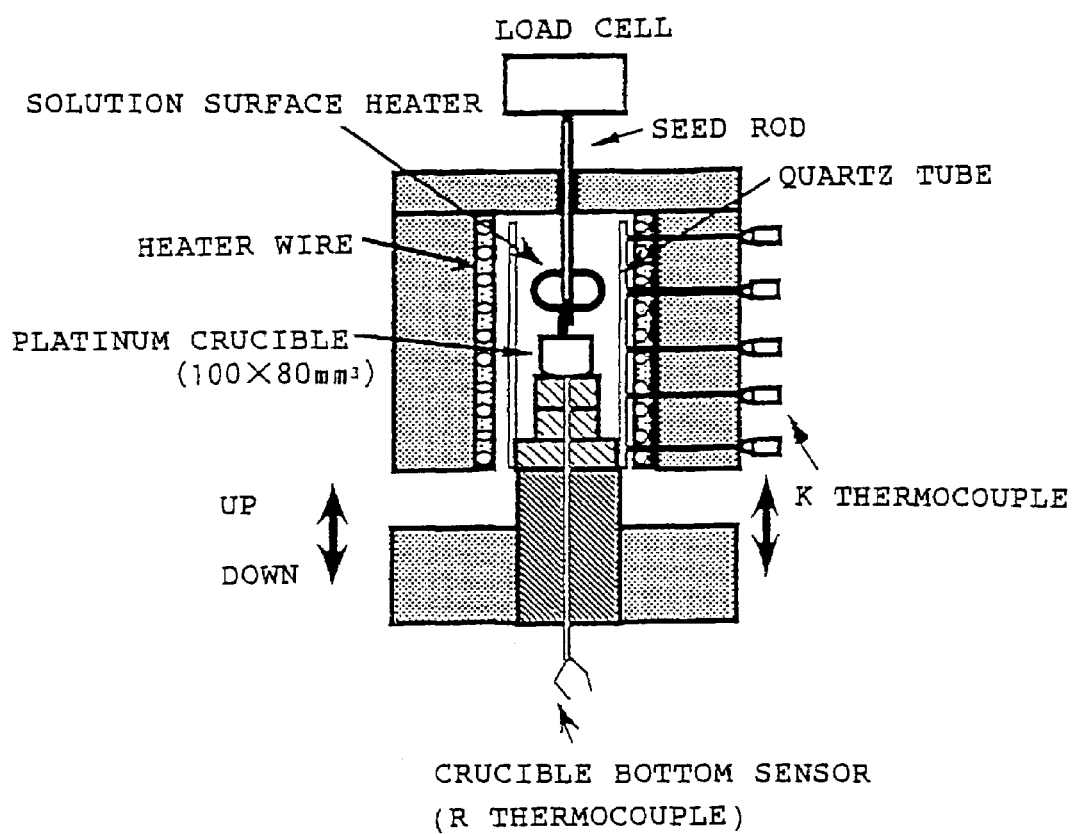
FIG. 1 is a cross-sectional view of the construction of a growing furnace used in an embodiment of the present invention.

Source materials having the following compositions were used to grow a crystal in the growing furnace shown in FIG. 1 by way of example:

$K_2CO_3$ (34 mol %)

$Al_2O_3$ (19 Mol %)

$B_2O_3$ (45 mol %)

KCl (2 mol %).

The growing furnace shown in FIG. 1 has a construction like a cylindrical resistance heating furnace. In this furnace, its heater is vertically divided into five layers each of which can be independently controlled. A temperature program setting device capable of controlling temperature in units of a minimum of 0.1° C. is used as a control part for the heater, and a quartz tube is disposed between the heater and a crucible so that a steep temperature gradient near the crucible is restrained. The crucible is made of platinum, and is arranged to move up and down by an elevating device lying at the bottom of the furnace, so that the crucible can be charged with a source material in a heated state. In addition, in order to correct a change in the temperature of the solution surface, a solution surface heater is disposed to prevent a decrease in temperature due to evaporation near the solution surface, thereby providing a temperature distribution optimum for crystal growth. At a temperature of about 1,000° C., the source material was melted in the atmospheric air, and was then cooled to grow into a microcrystal. The rate of temperature decrease was 0.2–0.3° C./day, and the speed of rotation was 30 rpm (the direction of rotation was reversed at intervals of 3 minutes).

Through the above-described growth, a crystal of size about 3 mm was obtained.

Figure 2:
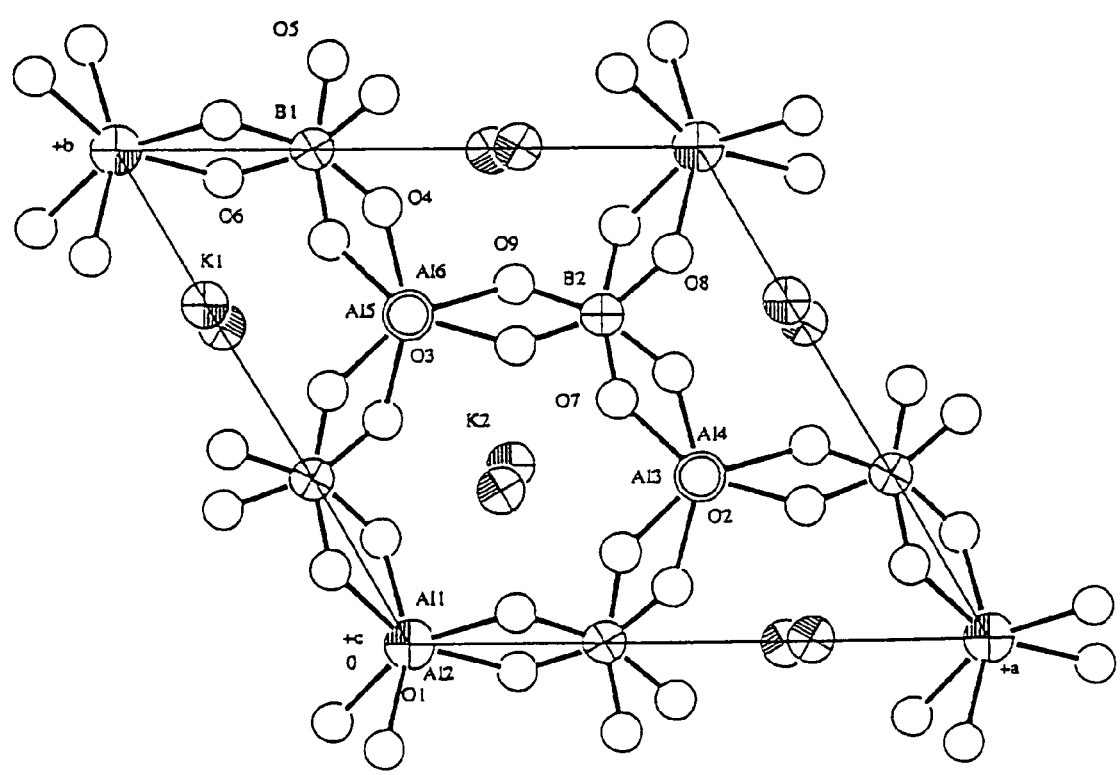
FIG. 2 is a view showing a result of X-ray diffraction of the structure of a KAB crystal according to the invention.
Figure 3:
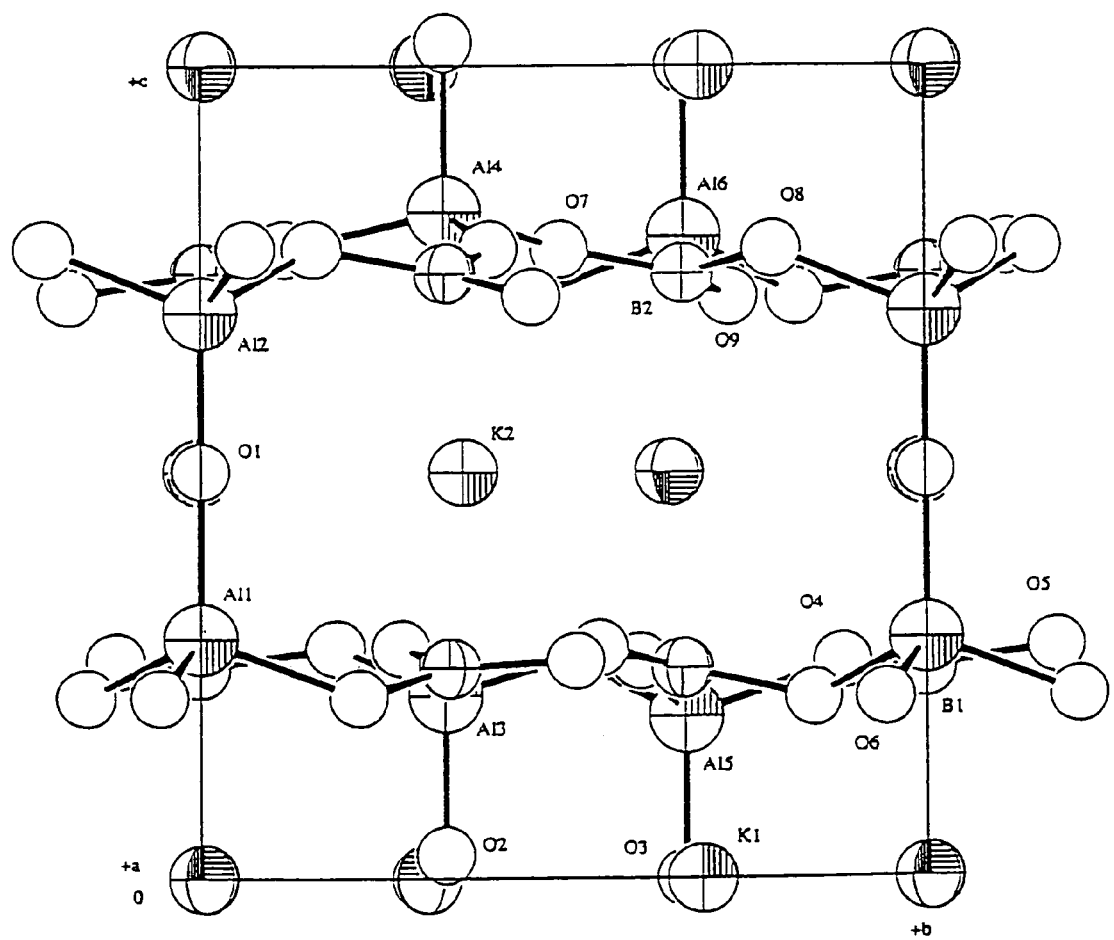
FIG. 3 is another a view showing another result of X-ray diffraction similar to that shown in FIG. 2.

The result of an analysis using plasma emission spectrometry (ICP) showed that this crystal had the composition of $K_2Al_2B_2O_7$. As is apparent from the result of four circle X-ray diffractometry shown in FIGS. 2 and 3, it was confirmed that the structure of the obtained crystal was similar to that of the SBBO crystal but K and Al were 100% substituted for its Sr and Be sites, respectively.

In the evaluation of wavelength conversion characteristic (nonlinearity) of the crystal, when the crystal was illuminated with the fundamental light (wavelength 1,064 nm) of a Nd:YAG laser, the occurrence of light of second harmonic (532 nm) was confirmed.

In addition, when the double refraction index of this crystal was measured by an oil immersion method, it was confirmed that the value was 0.07 and was approximately equal to that of the SBBO crystal.

It is to be noted that since the shortest SHG wavelength of the prior art KBBF crystal is 185 nm or less and that of the prior art SBBO crystal is 200 nm or less, the KAB crystal of this invention can be phase-matched to approximately 200 nm. The absorption edge of the KAB crystal was 180 nm or less.

In addition, the growth of the KAB crystal of this invention is far more easy and far more efficient compared to the case of growth of SBBO and KBBF.

Incidentally, the Vickers hardness of the grown KAB crystal was about 300, and from the result of a water resistance test using immersion at room temperature, it was confirmed that the KAB crystal did not melt even after the passage of ten days or more.

In accordance with the invention, there is provided a $K_2Al_2B_2O_7$ (KAB) crystal as a vacuum ultraviolet light generating nonlinear optical crystal which is easy to grow and of high practical use, and a wavelength conversion method using this crystal, as well as an element and a wavelength conversion apparatus for use in the method.

What is claimed is:

1. A method of making a nonlinear optical crystal for generating ultraviolet light, said nonlinear optical crystal comprising a compound represented by the formula $K_2Al_2B_2O_7$, said method comprising growing a nonlinear optical crystal comprising a compound represented by the formula $K_2Al_2B_2O_7$ via solution growth with a flux that is at least one material selected from the group consisting of lead oxide, sodium fluoride, cesium fluoride, lead fluoride or potassium chloride.

2. A method of converting a wavelength for generating ultraviolet light said method comprising:
   growing a nonlinear optical crystal comprising a compound represented by the formula $K_2Al_2B_2O_7$ via solution growth with a flux, and
   illuminating, with laser light, a nonlinear optical crystal comprising a compound represented by the formula $K_2Al_2B_2O_7$.

3. A method of converting a wavelength according to claim 2, wherein said growing comprises growing by solution growth with a flux that is at least one material selected from the group consisting of lead oxide, sodium fluoride, cesium fluoride, lead fluoride or potassium chloride.

4. A wavelength conversion element for generating ultraviolet light, said wavelength conversion element comprising:
   a nonlinear optical crystal comprising a compound represented by the formula $K_2Al_2B_2O_7$,
   wherein said nonlinear optical crystal has an input surface capable of receiving input laser light having a fundamental wavelength, and
   wherein said nonlinear optical crystal has an output surface capable of transmitting an output laser light having a second harmonic.

5. A wavelength conversion element according to claim 4 wherein said nonlinear optical crystal comprises a crystal grown via solution growth with a flux.

6. A wavelength conversion element according to claim 5, wherein said growing comprises growing by solution growth with a flux that is at least one material selected from the group consisting of lead oxide, sodium fluoride, cesium fluoride, lead fluoride or potassium chloride.

7. A wavelength conversion apparatus for generating ultraviolet light, said wavelength conversion apparatus comprising:
   a wavelength conversion element comprising a nonlinear optical crystal comprising a compound represented by the formula $K_2Al_2B_2O_7$,
   wherein said nonlinear optical crystal has an input surface capable of receiving input laser light having a fundamental wavelength, and
   wherein said nonlinear optical crystal has an output surface capable of transmitting an output laser light having a second harmonic.

8. A wavelength conversion apparatus according to claim 7, wherein said nonlinear optical crystal comprises a crystal grown via solution growth with a flux.

9. A wavelength conversion apparatus according to claim 8, wherein said growing comprises growing by solution growth with a flux that is at least one material selected from the group consisting of lead oxide, sodium fluoride, cesium fluoride, lead fluoride or potassium chloride.

10. A wavelength conversion method for generating ultraviolet light, said wavelength conversion method comprising:
    illuminating, with laser light, a nonlinear optical crystal comprising a compound represented by the formula $K_2Al_2B_2O_7$.

\* \* \* \* \*